United States Patent
Xu et al.

(10) Patent No.: US 10,176,282 B2
(45) Date of Patent: Jan. 8, 2019

(54) TIMING DELAY CHARACTERIZATION METHOD, MEMORY COMPILER AND COMPUTER PROGRAM PRODUCT

(71) Applicant: TAIWAN SEMICONDUCTOR MANUFACTURING COMPANY, LTD., Hsinchu (TW)

(72) Inventors: Shaojie Xu, San Jose, CA (US); Yukit Tang, San Jose, CA (US); Pao-Po Hou, Saratoga, CA (US); Derek C. Tao, Fremont, CA (US); Annie-Li-Keow Lum, San Jose, CA (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 624 days.

(21) Appl. No.: 14/638,444

(22) Filed: Mar. 4, 2015

(65) Prior Publication Data
US 2015/0178430 A1 Jun. 25, 2015

Related U.S. Application Data

(62) Division of application No. 13/800,005, filed on Mar. 13, 2013, now Pat. No. 8,997,031.

(51) Int. Cl.
G06F 17/50 (2006.01)
(52) U.S. Cl.
CPC ...... G06F 17/5036 (2013.01); G06F 17/5031 (2013.01); G06F 2217/84 (2013.01)

(58) Field of Classification Search
CPC ............... G06F 17/5068; G06F 17/505; G06F 17/5081; G06F 11/3608; G06F 17/5009; G06F 17/5022; G06F 17/5031; G06F 17/5045; B81B 7/0006; B81B 3/001; G01B 7/02
(Continued)

(56) References Cited

U.S. PATENT DOCUMENTS

| | | | |
|---|---|---|---|
| 5,852,445 A | 12/1998 | Yoshikawa et al. | |
| 6,249,901 B1 * | 6/2001 | Yuan ................... | G06F 17/5022 716/103 |

(Continued)

*Primary Examiner* — Nghia M Doan
(74) *Attorney, Agent, or Firm* — Hauptman Ham, LLP

(57) ABSTRACT

A memory compiler includes a processor configured to perform a simulation of an operation of an input stage coupled to an input terminal of a memory circuit, wherein the simulation of the operation of the input stage is performed for various slew rate values at the input terminal to obtain corresponding extrinsic input timing delays. The processor is further configured to perform a simulation of an operation of an output stage coupled to an output terminal of the memory circuit, wherein the simulation of the operation of the output stage is performed for various capacitance loading values at the output terminal to obtain corresponding extrinsic output timing delays. The processor is further configured to perform a simulation of an operation of a section of the memory circuit between the input stage and the output stage to obtain an intrinsic timing delay. The processor is further configured to generate timing delays of the memory circuit based on the extrinsic input timing delays, the extrinsic output timing delays and the intrinsic timing delay.

20 Claims, 7 Drawing Sheets

(58) Field of Classification Search
USPC .................................. 716/108, 113–115, 134
See application file for complete search history.

(56) References Cited

U.S. PATENT DOCUMENTS

| | | | |
|---|---|---|---|
| 7,721,236 B2 | 5/2010 | Hwang et al. | |
| 2009/0319972 A1* | 12/2009 | Onodera ............. | G06F 17/5031 |
| | | | 716/113 |

* cited by examiner

TIMING DELAY CHARACTERIZATION METHOD, MEMORY COMPILER AND COMPUTER PROGRAM PRODUCT

PRIORITY CLAIM

The present application is a divisional of U.S. application Ser. No. 13/800,005, filed Mar. 13, 2013, which is incorporated herein by reference in its entirety.

BACKGROUND

The recent trend in miniaturizing integrated circuits (ICs) has resulted in smaller devices which consume less power, yet provide more functionality at higher speeds than before. The miniaturization process has also resulted in stricter design and manufacturing specifications. Pre-manufacture checking and testing are performed to make sure that a semiconductor circuit can be made and will function as designed. Timing delay characterization is a common checking procedure which gives various timing delays for evaluating or optimizing the semiconductor circuit. At advanced technology nodes where semiconductor circuit density is high, the amount of data to be processed in a timing delay characterization increases. As a result, it becomes more difficult to achieve the desired accuracy at an acceptable processing speed.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Figure 1:
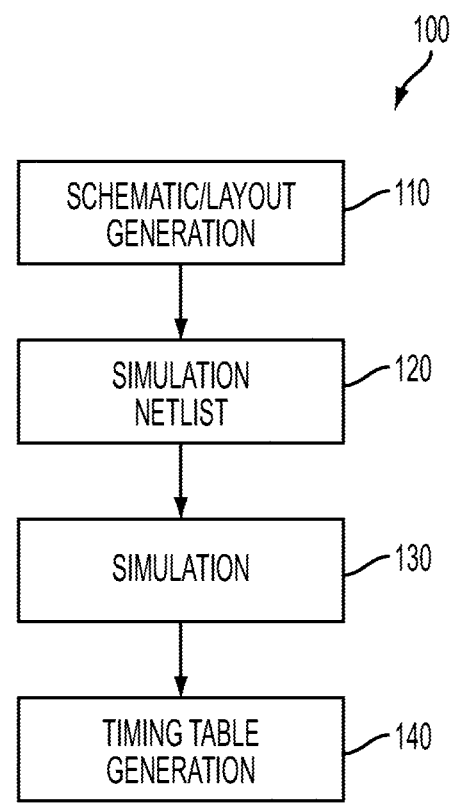
FIG. 1 is a functional flow chart of at least a portion of a semiconductor circuit design flow in accordance with some embodiments.

It is to be understood that the following disclosure provides many different embodiments or examples, for implementing different features of various embodiments. Specific examples of components and arrangements are described below to simplify the present disclosure. An inventive concept may; however, be embodied in many different forms and should not be construed as being limited to the embodiments set forth herein. It will be apparent, however, that one or more embodiments may be practiced without these specific details. Like reference numerals in the drawings denote like elements.

In some embodiments, a signal path between an input terminal and an output terminal of a semiconductor circuit is divided into several stages. An input stage coupled to the input terminal and an output stage coupled to the output terminal are simulated separately from the rest of the signal path. Input and output parameter values at the input and output terminals are varied during the simulation of the input and output stages to obtain extrinsic timing delays associated with the input and output stages. An intrinsic timing delay associated with the rest of the signal path is obtained by another simulation. The obtained extrinsic and intrinsic timing delays are combined and stored in a timing delay data store which, in some embodiments, comprises a database or other suitable data storage scheme. Compared to other approaches where the entire signal path is simulated multiple times at various input and output parameter values, the timing delay characterization methodology in one or more embodiments is faster, because the extrinsic timing delays are obtained without simulating the entire signal path and the intrinsic timing delay is obtained without repeated simulations for various input and output parameter values. In one or more embodiments, the timing delay data store is generated or populated without data interpolation and is more accurate than other approaches where data interpolation is needed due to insufficient simulation data.

FIG. 1 is a functional flow chart of at least a portion of a semiconductor circuit design flow 100 in accordance with some embodiments. The design flow 100 utilizes one or more electronic design automation (EDA) tools for testing a design of a semiconductor circuit before manufacturing. The EDA tools, in some embodiments, are one or more sets of executable instructions for execution by a processor or controller or a programmed computer to perform the indicated functionality. In one or more embodiments, the semiconductor circuit is a memory circuit.

At operation 110, a design of a semiconductor circuit is provided by a circuit designer. In some embodiments, the design of the semiconductor circuit includes a schematic, i.e., an electrical diagram, of the semiconductor circuit. For example, the schematic is generated or provided in the form of a schematic netlist, such as a Simulation Program with Integrated Circuit Emphasis (SPICE) netlist. In some embodiments, the design of the semiconductor circuit includes a layout, i.e., a physical arrangement of various components, of the semiconductor circuit. For example, the layout is generated in the form of a Graphic Design System (GDS) file by an EDA tool. Other data formats for describing the design are usable in some embodiments.

At operation 120, a simulation netlist of the semiconductor circuit is prepared. In some embodiments where the design of the semiconductor circuit is in the form of a schematic netlist, the schematic netlist is used as the simulation netlist. In some embodiments, where the design of the semiconductor circuit is provided in the form of a layout, a layout extraction tool is employed to extract electronic components such as transistors, diodes, resistors, capacitors etc., from the provided layout, and generate a simulation netlist. In one or more embodiments, the layout extraction tool is implemented by a layout editor tool, such as VIRTUOSO available from Cadence Design Systems, Inc. of San Jose, Calif.

At operation 130, a simulation is performed, using the simulation netlist, to determine various timing delays characterizing the semiconductor circuit. The simulation is performed to obtain timing delays at various input and output parameter values to verify whether the semiconductor circuit is configured to accommodate, in operation, variations of the input and output parameters within certain ranges. A common input parameter is a slew rate of an input signal at the input side, and a common output parameter is a capacitance loading (also referred to herein as "loading") at the output side. Other parameters, such as drive current, drive voltage, input signal voltage etc., are within the scope of various embodiments.

At operation 140, a timing table or timing delay data store is generated or populated based on the simulation results. The timing delay data store defines one or more relationships between the input and output parameters and the timing delays caused by such input and output parameters. For example, for each pair of a slew rate value and a loading value, the timing delay data store includes one or more timing delays caused by the pair of slew rate and loading values in one or more corresponding signal paths of the semiconductor circuit. The timing delays in the timing delay data store are used to verify whether the design of the semiconductor circuit meets a predetermined specification, e.g., whether the semiconductor circuit exhibits undesirable timing delays under certain input and/or output conditions. If the design does not meet the predetermined specification, the semiconductor circuit is redesigned. Otherwise, the design is passed to subsequent operations which include, for example, manufacture or additional verification processes. Another use of the timing delays in the timing delay data store is for optimization of the semiconductor circuit to improve timing characteristics thereof. The process described with respect to operations 130-140 is commonly referred to as "timing delay characterization."

Figure 2A:
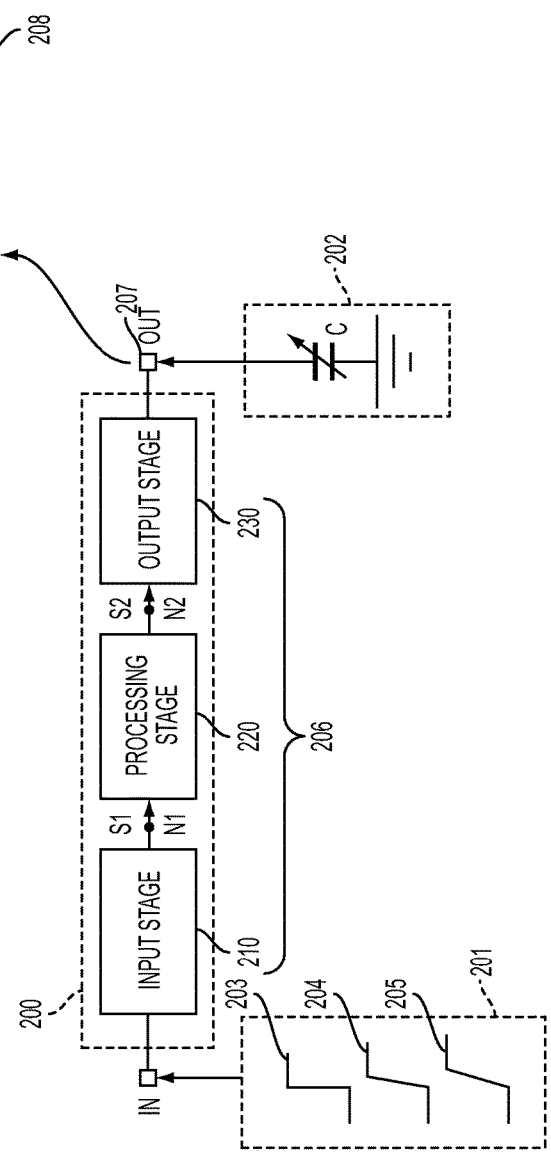
FIGS. 2A and 2B are schematic diagrams of a segment of a semiconductor circuit in a timing delay characterization in accordance with some embodiments.

FIG. 2A is a schematic diagram of a segment of a semiconductor circuit 200 in a timing delay characterization in accordance with some embodiments. The semiconductor circuit 200 includes an input terminal IN and an output terminal OUT. In a timing delay characterization of the semiconductor circuit 200, an input signal 201 is applied to the input terminal IN, whereas a load condition 202 is applied to the output terminal OUT. The input signal 201 has a variable input parameter, such as slew rate. A "slew rate" of the input signal is the rate at which the input signal changes from a low level to a high level, or vice versa. The slew rate of the input signal 201 is variable to have different values 203, 204, 205 as illustrated in FIG. 2A. For example, the slew rate value 203 is 0.1 ns, meaning that the input signal 201 changes from the low level to the high level in 0.1 ns. The slew rate value 204 is greater than the slew rate value 203, meaning that the input signal 201 with the slew rate value 204 takes a longer amount of time to change from the low level to the high level than with the slew rate value 203. The slew rate value 205 is greater than the slew rate value 204. The load condition 202 includes a variable output parameter, such as capacitance loading (or loading). The variable loading is represented in FIG. 2A as a variable capacitor C. The slew rate and loading are varied within certain ranges which the semiconductor circuit is designed to accommodate in operation. In one or more embodiments, the slew rate is varied from 0.1 ns to 5 ns, and the loading is varied from 1 and 20 fF (femtofarads, $10^{-15}$ F). Other slew rate and/or loading ranges are within the scope of various embodiments.

When the input signal 201 is applied to the input terminal IN, the input signal 201 propagates along a signal path 206 from the input terminal IN, through one or more components of the semiconductor circuit 200, and exits as an output signal 207 at the output terminal OUT. The output signal 207 is affected by the load condition 202 and exhibits a timing delay relative to the input signal 201. At various slew rate and/or loading values, the timing delays also vary. The timing delays, together with the corresponding slew rate and loading values, are included in a timing table 208. For example, the timing table 208 is a 5×5 table including 25 timing delays (i.e., Timing delay 11~Timing delay 55) corresponding to five slew rate values (i.e., Slew 1~Slew 5) and five loading values (i.e., Loading 1~Loading 5). Other table sizes, such as 7×7 or 9×9, are within the scope of various embodiments. When multiple pairs of input and output terminals are considered in the timing delay characterization, multiple timing tables 207 are obtained. The timing tables are combined into a timing delay data store for evaluation and/or optimization of the semiconductor circuit.

The manner in which the timing delays are obtained differs from one approach to another. In some approaches, the entire semiconductor circuit 200 or signal path 206 is simulated for each pair of slew rate and loading values. For example, the Timing delay 11 is obtained by simulating the entire semiconductor circuit 200 or the entire signal path 206 for the pair of Slew 1 and Loading 1. To obtain another timing delay, i.e., Timing delay 12, another simulation of the entire semiconductor circuit 200 or the entire signal path 206 is performed for the corresponding pair of Slew 1 and Loading 2. Such full-circuit simulations are often time consuming and computer-resource demanding, especially at advanced technology nodes where semiconductor circuits have high density. Under certain circumstances, it is undesirable or practically impossible to perform 25 full-circuit simulations to obtain all 25 timing delays Timing delay 11~Timing delay 55 to populate the 5×5 timing table 208.

Some approaches attempt to reduce the calculation amount and increase the processing speed by performing simulations for a few pair of slew rate and loading values, and then interpolating the simulation data to populate the 5×5 timing table 208. For example, nine full circuit simulations are performed to obtain nine corresponding timing delays, e.g., Timing delay 11~Timing delay 15 and Timing delay 21~Timing delay 51. The remaining sixteen timing delays, i.e., Timing delay 22~Timing delay 55, are determined by data interpolation of the nine simulated timing delays. Under certain circumstances, even the reduced number (i.e., nine) of simulations is still too high to implement at an acceptable processing speed. In addition, data interpolation results in inaccuracy that, in some situations, reaches an unacceptably high level, e.g., of about 30%. Some approaches attempt to reduce the calculation amount by using simplified models of semiconductor circuits, rather than the actual schematics of the semiconductor circuit, for simulations. Such simplified models also raise inaccuracy concerns under certain circumstances.

Variations of input and output parameters at the input terminal IN and the output terminal OUT do not equally affect the timing delays associated with various sections along the signal path 206. Specifically, the signal path 206 includes an input stage 210 coupled to the input terminal IN, a processing stage 220 coupled to the input stage 210 at a node N1, and an output stage 230 coupled to the output terminal OUT and also to the processing stage 220 at a node N2. The processing stage 220 is coupled in series between the input stage 210 and output stage 230. Variations of input and output parameters at the input terminal IN and the output terminal OUT have different effects on the input stage 210, processing stage 220 and output stage 230 of the signal path 206.

The input stage 210 of the signal path 206 is coupled to the input terminal IN and configured to modify the input signal 201 to an intermediate signal S1 outputted at the node N1 where the input stage 210 is coupled to the processing stage 220. In some embodiments, the input stage 210 is configured such that, despite signal variations at the input terminal IN, the intermediate signal S1 has one or more parameters, such as voltage level, timing, frequency etc., which is/are within corresponding nominal ranges suitable for processing by the processing stage 220. In some embodiments, data or information included in the input signal 201 is not altered or distorted when the input signal 201 is modified to the intermediate signal S1, even though the intermediate signal S1 has a different voltage level, timing or frequency from the input signal 201. As a result, variations at the input terminal IN are reduced or removed before reaching the processing stage 220 while maintaining data integrity, thereby preventing or reducing a possibility that the variations at the input terminal IN affect data processing accuracy of the processing stage 220. In some embodiments, the input stage 210 includes an input buffer for temporarily storing the input signal 201 and/or a delay stage for imparting a predetermined delay on the input signal 201 for synchronization purposes. In one or more embodiments, more than one delay stages are included in the input stage 210. Such input buffer and/or delay stage exhibit(s) a variable timing delay dependent on variations of an input parameter, such as slew rate, at the input terminal IN. The timing delay associated with the input stage 210 is referred to herein as "extrinsic input timing delay."

The processing stage 220 of the signal path 206 is configured to process data included in the input signal 201, via the intermediate signal 51, and to output corresponding data in an intermediate signal S2 at the node N2. For example, the processing stage 220 includes a logic circuit that, upon receipt of data included in the intermediate signal S1, performs one or more logic functions on the received data and outputs the result at the node N2 as the intermediate signal S2. In another example, the processing stage 220 includes a memory cell or memory array that, upon receipt of an address included in the intermediate signal S1, returns the data stored in the memory cell or memory array via the intermediate signal S2.

The output stage 230 of the signal path 206 is coupled to the processing stage 220 at the node N2, and configured to modify the intermediate signal S2 to the output signal 207 outputted at the output terminal OUT. In some embodiments, the output stage 230 is configured such that, despite load variations at the output terminal OUT, the intermediate signal S2 is not affected and has one or more parameters, such as voltage level, timing, frequency etc., which is/are within corresponding nominal ranges of the processing stage 220. In some embodiments, data or information included in the intermediate signal S2 is not altered or distorted when the intermediate signal S2 is modified to the output signal 207, even though the output signal 207 has a different voltage level, timing or frequency from the intermediate signal S2. As a result, despite load variations at the output terminal OUT, data integrity is maintained as the intermediate signal S2 propagates from the node N2 to the output terminal OUT, thereby preventing or reducing a possibility that the load variations at the output terminal OUT affect data processing accuracy of the processing stage 220. In some embodiments, the output stage 230 includes an output buffer for temporarily storing the intermediate signal S2 and/or at least one delay stage for imparting a predetermined delay on the intermediate signal S2 for synchronization purposes. Such output buffer and/or delay stage exhibit(s) a variable timing delay dependent on variations of an output parameter, such as loading, at the output terminal OUT. The timing delay associated with the output stage 230 is referred to herein as "extrinsic output timing delay."

As described herein, the intermediate signal 51 and/or the intermediate signal S2 has/have one or more parameters, such as voltage level, timing, frequency etc., which is/are within corresponding nominal ranges suitable for operation of the processing stage 220. In other words, signal parameters of the intermediate signal 51 and intermediate signal S2 are not significantly affected by variations at the input terminal IN and output terminal OUT. As a result, the processing stage 220 is not significantly affected by variations at the input terminal IN and output terminal OUT and exhibits a timing delay independent of variations of input and output parameters at the input terminal IN and output terminal OUT. In some embodiments, the timing delay of the processing stage 220 is considered independent of the variations of the input and output parameters when the timing delay of the processing stage 220 remains constant, or varies within a predetermined accuracy tolerance, at various input and output parameter values. The timing delay associated with the processing stage 220 is referred to herein as "intrinsic timing delay."

Because the intrinsic timing delay of the processing stage 220 is independent of the input and output parameter variations, it is sufficient, in some embodiments, to obtain the intrinsic timing delay once, e.g., by one simulation, and use the obtained intrinsic timing delay to determine all timing delays in the timing table 208. This approach greatly reduces the amount of simulation calculation and increases the processing speed, without significantly sacrificing accuracy.

Figure 2B:
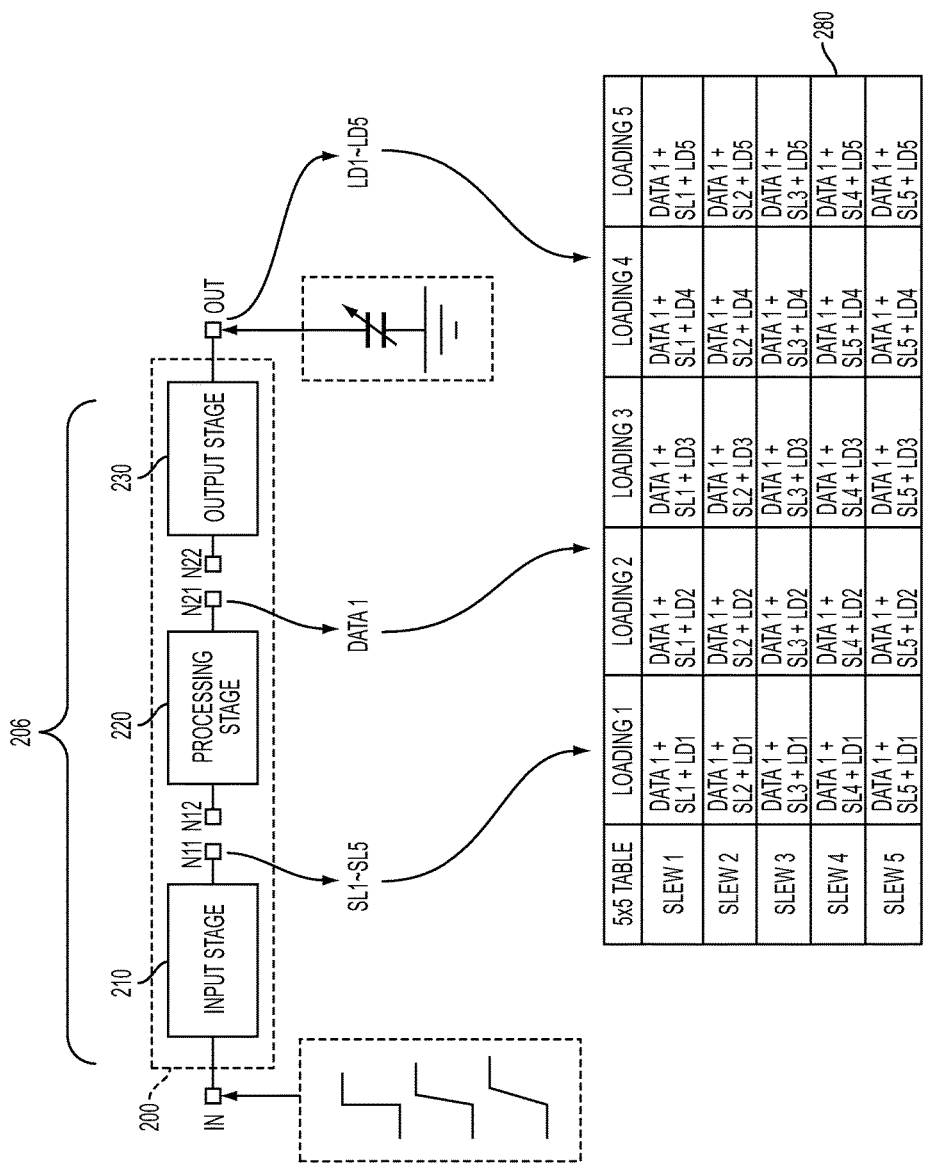

FIG. 2B is a schematic diagram of a segment of the semiconductor circuit 200 in a timing delay characterization in accordance with some embodiments. The signal path 206 is divided into the input stage 210, the processing stage 220 and the output stage 230. In some embodiments, the division is performed by replacing the node N1 where the input stage 210 is coupled to the processing stage 220 with two nodes or pins N11, N12 disconnected from each other. Similarly, the node N2 where the output stage 230 is coupled to the processing stage 220 is replaced with two nodes or pins N21, N22 disconnected from each other. On the one hand, the disconnected input stage 210 and output stage 230 are simulated separately from the processing stage 220 at various input and output parameter values to determine the corresponding extrinsic input and output timing delays for each pair of input and output parameter values. On the other hand, the processing stage 220 is simulated to determine the corresponding intrinsic timing delay which is independent of the input and output parameter variations. The determined extrinsic and intrinsic timing delays are combined in a timing table 280.

For example, in one or more embodiments, a simulation of the input stage 210 is performed with various slew rate values Slew 1~Slew 5 at the input terminal IN, to obtain corresponding extrinsic input timing delays SL1~SL5 between the signals at the input terminal IN and the signals at the node N11. Each of the extrinsic input timing delays SL1~SL5 is inputted into a corresponding row of the timing table 280. For example, the extrinsic input timing delay SL1 corresponding to the slew rate value Slew 1 is inputted into five cells of the row corresponding to the slew rate value Slew 1.

As described herein, the signals at the node N11 corresponding to the node N1 in FIG. 2A are not significantly affected by slew rate variations at the input terminal IN. Any signal obtained at the node N11 during the simulation of the input stage 210 is usable as an input signal for simulating the processing stage 220. Specifically, the simulated signal at the node N11 corresponding to any one of the slew rate values Slew 1~Slew 5 is applied to the node N12 as the input signal for a separate simulation of the processing stage 220. Alternatively, instead of a signal obtained from the simulation of the input stage 210, a predetermined signal having parameters within the nominal ranges of the processing stage 220 is applied to the node N12 as the input signal for the simulation of the processing stage 220. As result of the simulation, the corresponding intrinsic timing delay Data 1 between the signal at the node N12 and the signal at the node N21 is obtained. The intrinsic timing delay Data 1 is independent of slew rate and loading variations, and is inputted in all cells of the timing table 280.

As described herein, the signal at the node N21 corresponding to the node N2 in FIG. 2A is not significantly affected by loading variations at the output terminal OUT. The simulated signal obtained at the node N21 during the simulation of the processing stage 220 is applied to the node N22 as the input signal for a further simulation of the output stage 230 with various loading values Loading 1~Loading 5 at the output terminal OUT. Alternatively, instead of a signal obtained from the simulation of the processing stage 220, a predetermined signal having parameters within the nominal ranges of the processing stage 220 is applied to the node N22 as the input signal for the simulation of the output stage 230. As result of the simulation, corresponding extrinsic output timing delays LD1~LD5 between the signal at the node N22 and the signals at the output terminal OUT are obtained. Each of the extrinsic output timing delays LD1~LD5 is inputted into a corresponding column of the timing table 280. For example, the extrinsic output timing delay LD1 corresponding to the loading value Loading 1 is inputted into five cells of the column corresponding to the loading value Loading 1.

The extrinsic and intrinsic timing delays inputted in each cell of the timing table 280 are combined to obtain a timing delay of the signal path 206 for the corresponding pair of slew rate and loading values. For example, the extrinsic and intrinsic timing delays SL1, LD1 and Data 1 inputted in the first cell of the timing table 280 are combined to provide the timing delay of the signal path 206 for the corresponding pair of the slew rate value Slew 1 and the loading value Loading 1. In at least one embodiment, the extrinsic and intrinsic timing delays inputted in each cell of the timing table 280 are summed-up as illustrated in FIG. 2B. In at least one embodiment, a weighting factor is given to one or more of the extrinsic and intrinsic timing delays before summing up. In at least one embodiment, a non-linear function is used to combine the extrinsic and intrinsic timing delays. In accordance with at least one embodiment, such weighting factor and/or non-linear function is/are predetermined based on past simulations for similar circuitry.

Modifications to the above described approach are within the scope of various embodiments. For example, in some embodiments, the simulations of the input stage 210 and the output stage 230 are performed simultaneously. In some embodiments, the intrinsic timing delay is obtained by a simulation of the entire signal path 206 for a pair of slew rate and loading values, e.g., Slew 1 and Loading 1. The obtained timing delay of the signal path 206, and the corresponding extrinsic input and output timing delays SL1, LD1 are then used to determine the intrinsic timing delay Data 1, e.g., by subtracting SL1, LD1 from the obtained timing delay of the signal path 206. In some embodiments, the input stage 210 and/or the output stage 230 is/are a standard block(s) (e.g., a buffer, inverter, a delays stage, or combination thereof etc.) used in various semiconductor circuits. The extrinsic timing delays associated with such a standard block for various pairs of slew rate and loading values are pre-determined, e.g., by prior simulations, and stored. During the generation of the timing table 280, the predetermined and stored extrinsic timing delays are read out and filled in the corresponding cells of the timing table 280.

Compared to other approaches where the entire signal path is simulated multiple times for various pairs of slew rate and loading values and/or where data interpolation is employed due to insufficient simulation data, the approach described herein in accordance with some embodiments is faster and/or more accurate. Specifically, in accordance with at least one embodiment, repeated simulations for various pairs of slew rate and loading values are performed not for the entire signal path, but for a part thereof, i.e., the input stage and the output stage. The input stage and output stage are, in most cases, significantly smaller and less complex than the entire signal path. Therefore, it is possible to complete a simulation of the input stage and output stage at a much faster processing speed than a full-circuit simulation of the entire signal path. In one or more embodiments, the faster processing speed of the simulation of the input stage and output stage permits the simulation of the input stage and output stage to be repeated for every pair of slew rate and loading values, without resorting to data interpolation and/or simplified modeling of the semiconductor circuit. Therefore, accuracy of the timing delay characterization is increased. In at least one embodiment, the timing table or a timing delay data store obtained by the described approach achieves an error rate of less than 5%, which is a significant improvement over the error rate of at least 30% when the other approaches are employed. In some embodiments, the intrinsic timing delay is obtained by a simulation of the processing stage which is nearly as extensive as a full-circuit simulation of the entire signal path, because the processing stage includes most components along the signal path. However, such an extensive simulation is performed once, rather than repeatedly as in the other approaches, which further contributes to processing speed improvement.

Figure 3:
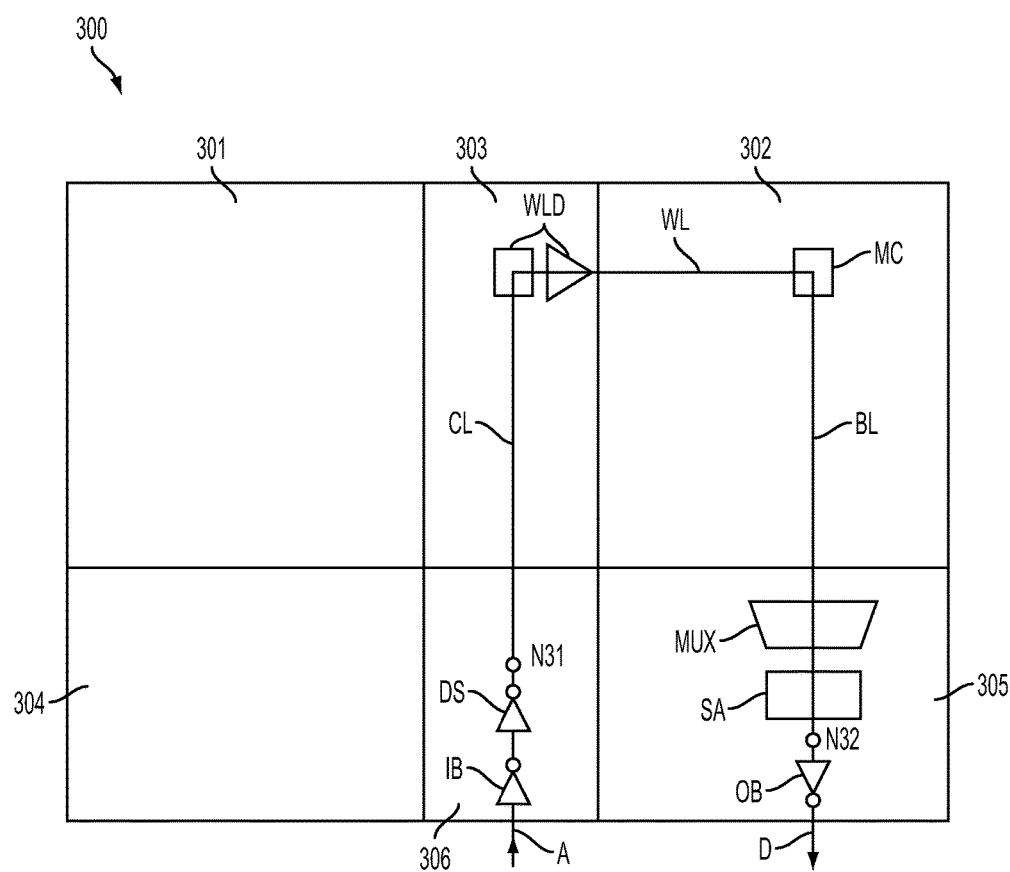
FIG. 3 is a schematic diagram of a segment of a memory circuit in a timing delay characterization in accordance with some embodiments.

FIG. 3 is a schematic diagram of a segment of a memory circuit 300 in a timing delay characterization in accordance with some embodiments. The memory circuit 300 includes memory cell arrays 301, 302, a control logic 303, data input/output units (IOs) 304, 305, and an IO controller 306. The memory circuit 300 is an example of the semiconductor circuit 200 in FIG. 2A.

Each of the memory cell arrays 301, 302 includes a plurality of memory cells arranged in a plurality of rows and columns. The memory cells in each column are coupled to at least one corresponding bit line for writing data to or reading data from the memory cells. The memory cells in each row are coupled to a corresponding word line for selecting the memory cells in a write or read operations. One or more power lines further run along the columns and/or the rows of memory cells for providing a power supply voltage and/or a reference voltage (such as the ground voltage) to the memory cells. In one or more embodiments, the memory cell arrays 301, 302 also include one or more control lines running along one or more columns and/or rows of memory cells for controlling various operations of the memory cells. In FIG. 3, one example memory cell MC and the associated word line WL and bit line BL are illustrated as parts of the memory array 302.

The control logic 303 includes a plurality of word line decoders/drivers coupled to the rows of memory cells in the memory cell arrays 301, 302 via the corresponding word lines. The word line decoders/drivers are configured to decode row addresses of the memory cells selected to be accessed in a read operation or a write operation. The word line decoders/drivers then enable the corresponding word lines corresponding to the decoded row addresses to permit access to the selected memory cells. In FIG. 3, one example word line decoder/driver WLD is illustrated as parts of the control logic 303. The word line decoder/driver WLD is coupled to the word line WL for selecting the memory cell MC.

The IOs 304, 305 are coupled to the columns of memory cells in the memory cell arrays 301, 302 via the corresponding bit lines. In one or more embodiments, the IOs 304, 305 are further coupled to the power lines of the memory cell arrays 301, 302. In one or more embodiments, the IOs 304, 305 include column selectors for selecting columns with the memory cells to be accessed, based on decoded column addresses provided from column decoders which are included, for example, in the IO controller 306. In one or more embodiments, the IOs 304, 305 include sense amplifiers for reading data from the selected memory cells in a read operation, and/or write drivers for writing data to the selected memory cells in a write operation. In one or more embodiments, the IOs 304, 305 include one or more multiplexers for coupling a plurality of bit lines to each sense amplifier or write driver. Data read out from or written into the memory cells of the memory cell arrays 301, 302 is transmitted between the memory cell arrays 301, 302 and the IOs 304, 305 via the corresponding bit lines of the memory cell arrays 301, 302, and further transmitted between the IOs 304, 305 and further circuitry via input and output terminals of the IOs 304, 305. In FIG. 3, one example multiplexer MUX, one example sense amplifier SA, and one output buffer OB are illustrated as parts of the IO 305. The multiplexer MUX is coupled between the bit line BL of the memory cell MC and the sense amplifier SA. An output of the sense amplifier SA is coupled to a node N32. The output buffer OB is coupled between the node N32 and an output terminal D of the IO 305. The output terminal D is a data output terminal for outputting data from the memory circuit 300 to outside circuitry, e.g., a memory controller. The node N32, output buffer OB, and output terminal D correspond to the node N2, the output stage 230 and the output terminal OUT in FIG. 2A.

The IO controller 306 is coupled to the control logic 303 by a plurality of control lines running in the direction of the columns of memory cells of the memory cell arrays 301, 302. The IO controller 306 is also coupled to the IOs 304, 305 by a plurality of further control lines running in the direction of memory cells of the memory cell arrays 301, 302. In one or more embodiments, the IOs 304, 305 and/or the control logic 303 are further coupled to the IO controller 306 via power lines. The IO controller 306 provides various signals along the control lines for controlling control logic 303 and the IOs 304, 305. Examples of signals provided via the control lines include, but are not limited to, address signals, clock signals, read/write enabling signals, etc. In FIG. 3, one example input buffer IB and one example delay stage DS are illustrated as parts of the IO controller 306. The input buffer IB and delay stage DS are coupled between an input terminal A of the IO controller 306 and a node N31. The node N31 is coupled to the word line decoder/driver WLD via a control line CL. Some embodiments include further components of the IO controller 306 coupled to the control line CL between the node N31 and the control logic 303. The input terminal A is an address input terminal for inputting an address, from outside circuitry, such as the memory controller, to access the memory cell MC the memory circuit 300. The input buffer IB and delay stage DS together define an input stage corresponding to the input stage 210 in FIG. 2A. The node N31 and input terminal A correspond to the node N1 and the input terminal IN in FIG. 2A.

In a timing delay characterization of the memory circuit 300, a pin-to-pin timing delay is determined between the input terminal A and the output terminal D, for various pair of slew rate and loading values. For example, when an input signal including an address of the memory cell MC is inputted at the input terminal A of the IO controller 306, the signal propagates through the input buffer IB and the delay stage DS to reach the node N31. The signal further propagates from the node N31 through one or more other components of the IO controller 306 to reach the control line CL. The signal on the control line CL arrives at the word line decoder/driver WLD and causes the word line decoder/driver WLD to send a word line signal along the word line WL to select the memory cell MC for data access. In response to the word line signal on the word line WL, the memory cell MC outputs a signal indicative of the data stored in the memory cell MC on the bit line BL. The signal with the read-out data is transmitted along the bit line BL to the multiplexer MUX and then the sense amplifier SA. The sense amplifier SA senses, amplifies and then outputs the signal with the read-out data to the output buffer OB via the node N32. The read-out data is eventually outputted from the memory circuit 300 as an output signal at the output terminal D. A timing delay between the input signal at the input terminal A and the output signal at the output terminal D is the pin-to-pin timing delay to be determined in the timing delay characterization. As the slew rate and/or loading vary at the input terminal A and output terminal D, the pin-to-pin timing delay also varies.

In some embodiments, a memory compiler, which is a set of automation scripts for memory compiler design automation, is used to determine the pin-to-pin timing delay between the input terminal A and the output terminal D. The memory compiler performs a simulation of an operation of the input stage coupled to the input terminal A for various slew rate values. The input stage includes the input buffer IB and delay stage DS between the input terminal A and the node N31. In one or more embodiments, the node N31 is identified by an operator, such as the circuit designer, as the end of the input stage and the beginning of the processing stage. In one or more embodiments, the node N31 is automatically identified by the memory compiler. For example, the memory compiler analyzes the netlist of the memory circuit 300 to look for a standard block coupled to the input terminal A, wherein the standard block is specified in a database of the memory compiler as an input stage. The memory compiler then designates an output of the found standard block as the node N31, and performs repeated simulations of the circuit section (i.e., the input stage) between the input terminal A and the node N31 at various slew rate values. The simulations of the input stage return various extrinsic input timing delays corresponding to the slew rate values.

Similarly, the memory compiler performs a simulation of an operation of the output stage coupled to the output terminal D for various loading values. The output stage includes the output buffer OB between the output terminal D and the node N32. In one or more embodiments, the node N32 is identified by an operator, such as the circuit designer, as the end of the processing stage and the beginning of the output stage. In one or more embodiments, the node N32 is automatically identified by the memory compiler. For example, the memory compiler analyzes the netlist of the memory circuit 300 to look for a standard block coupled to the output terminal D, wherein the standard block is specified in a database of the memory compiler as an output stage. The memory compiler then designates an input of the found standard block as the node N32, and performs repeated simulations of the circuit section (i.e., the output stage) between the output terminal D and the node N32 at various loading values. The simulations of the output stage return various extrinsic output timing delays corresponding to the loading values.

With the node N31 and node N32 identified, the memory compiler considers the section of the memory circuit 300 coupled to the nodes N31, N32 as the processing stage, and performs a simulation of the processing stage by applying an appropriate input signal to the node N31, as described with respect to FIG. 2A. The simulation returns the intrinsic timing delay associated with the processing stage. A timing table is generated or populated by the memory compiler based on the obtained extrinsic and intrinsic timing delays. One or more effects discussed with respect to FIGS. 2A-2B are obtained in the described timing delay characterization for the memory circuit 300.

Figure 4:
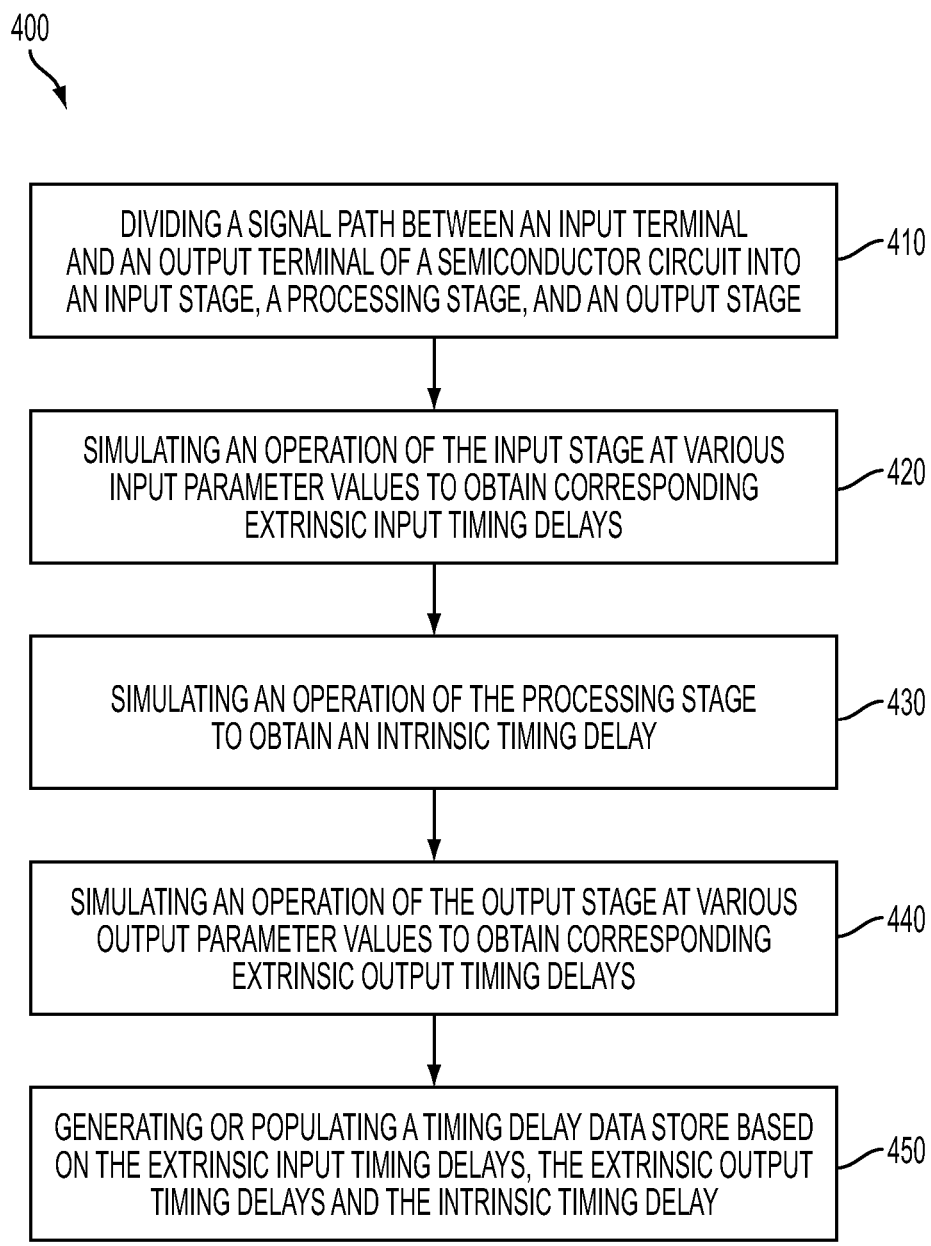
FIG. 4 is a flow chart of a timing delay characterization method in accordance with some embodiments.

FIG. 4 is a flow chart of a timing delay characterization method 400 in accordance with some embodiments. The method 400 is performed by one or more processors of one or more computer systems as described with respect to FIG. 6. The one or more processors are hardwired and/or programmed to define one or more tools described with respect to FIG. 1 and to perform one or more operations and/or functionality described with respect to FIGS. 2A, 2B and 3. In one or more embodiments where the semiconductor circuit is a memory circuit, the method 400 is used as an algorithm of a memory compiler for designing the memory circuit.

At operation 410, a signal path between an input terminal and an output terminal of a semiconductor circuit is divided into an input stage, a processing stage, and an output stage. For example, a signal path 206 between an input terminal IN and an output terminal OUT of a semiconductor circuit 200 is divided into an input stage 210, a processing stage 220, and an output stage 230, as described with respect to FIG. 2B.

At operation 420, an operation of the input stage is simulated at various input parameter values to obtain corresponding extrinsic input timing delays. For example, an operation of the input stage 210 is simulated at various input parameter values Slew 1~Slew 5 to obtain corresponding extrinsic input timing delays SL1~SL5, as described with respect to FIG. 2B.

At operation 430, an operation of the processing stage is simulated to obtain an intrinsic timing delay. For example, an operation of the processing stage 220 is simulated to obtain an intrinsic timing delay Data 1, as described with respect to FIG. 2B.

At operation 440, an operation of the output stage is simulated at various output parameter values to obtain corresponding extrinsic output timing delays. For example, an operation of the output stage 230 is simulated at various output parameter values Loading 1~Loading 5 to obtain corresponding extrinsic output timing delays LD1~LD5, as described with respect to FIG. 2B.

At operation 450, a timing delay data store is generated or populated based on the extrinsic input timing delays, the extrinsic output timing delays and the intrinsic timing delay. For example, a timing table 280 is generated based on the extrinsic input timing delays SL1~SL5, the extrinsic output timing delays LD1~LD5 and the intrinsic timing delay Data 1, as described with respect to FIG. 2B. In some embodiments, the delays are added to an existing data store to populate the data store.

Figure 5:
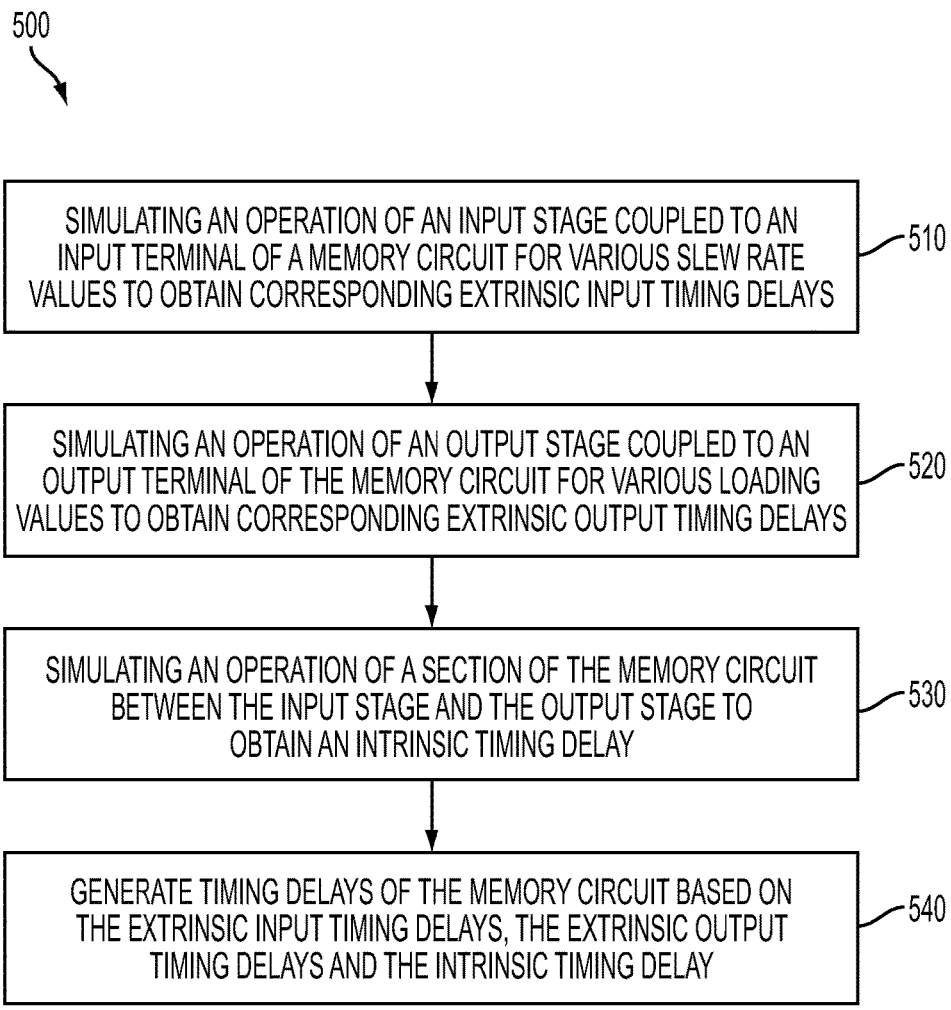
FIG. 5 is an algorithm of a memory compiler in accordance with some embodiments.

FIG. 5 is an algorithm 500 of a memory compiler in accordance with some embodiments.

At operation 510, an operation of an input stage coupled to an input terminal of a memory circuit is simulated for various slew rate values to obtain corresponding extrinsic input timing delays. For example, an operation of an input stage between a node N31 and an input terminal A of a memory circuit 300 is simulated for various slew rate values to obtain corresponding extrinsic input timing delays, as described with respect to FIG. 3.

At operation 520, an operation of an output stage coupled to an output terminal of the memory circuit is simulated for various loading values to obtain corresponding extrinsic output timing delays. For example, an operation of an output stage between a node N32 and an output terminal D of the memory circuit 300 is simulated for various loading values to obtain corresponding extrinsic output timing delays, as described with respect to FIG. 3.

At operation 530, an operation of a section of the memory circuit between the input stage and the output stage is simulated to obtain an intrinsic timing delay. For example, an operation of a section of the memory circuit 300 between the node N31 and the node N32 is simulated to obtain an intrinsic timing delay, as described with respect to FIG. 3.

At operation 540, timing delays of the memory circuit are generated based on the extrinsic input timing delays, the extrinsic output timing delays and the intrinsic timing delay, as described with respect to FIGS. 2B and 3.

Figure 6:
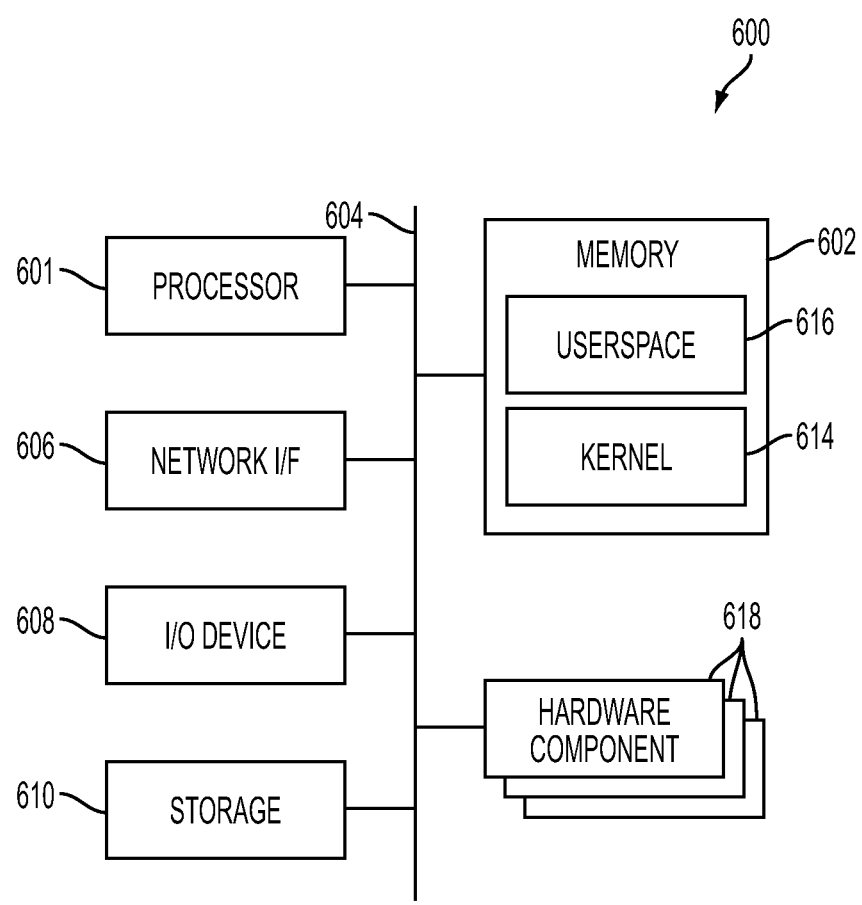
FIG. 6 is a block diagram of a computer system in accordance with some embodiments.

FIG. 6 is a block diagram of a computer system 600 in accordance with some embodiments. The memory compiler described with respect to FIG. 5 is realized in some embodiments by one or more computer systems 600 of FIG. 6. The system 600 comprises at least one processor 601, a memory 602, a network interface (I/F) 606, a storage 610, an input/output (I/O) device 608 communicatively coupled via a bus 604 or other interconnection communication mechanism.

The memory 602 comprises, in some embodiments, a random access memory (RAM) and/or other dynamic storage device and/or read only memory (ROM) and/or other static storage device, coupled to the bus 604 for storing data and/or instructions to be executed by the processor 601, e.g., kernel 614, user space 616, portions of the kernel and/or the user space, and components thereof. The memory 602 is also used, in some embodiments, for storing temporary variables or other intermediate information during execution of instructions to be executed by the processor 601.

In some embodiments, a storage device 610, such as a magnetic disk or optical disk, is coupled to the bus 604 for storing data and/or instructions, e.g., kernel 614, user space 616, etc. The I/O device 608 comprises an input device, an output device and/or a combined input/output device for enabling user interaction with the system 600. An input device comprises, for example, a keyboard, keypad, mouse, trackball, track pad, and/or cursor direction keys for communicating information and commands to the processor 601. An output device comprises, for example, a display, a printer, a voice synthesizer, etc. for communicating information to a user.

In some embodiments, one or more operations and/or functionality of the memory compiler described with respect to FIG. 5 are realized by the processor 601, which is programmed for performing such operations and/or functionality. One or more of the memory 602, the OF 606, the storage 610, the I/O device 608, and the bus 604 is/are operable to receive instructions, data, design rules, netlists, layouts, models and/or other parameters for processing by the processor 601.

In some embodiments, one or more of the operations and/or functionality described with respect to FIGS. 4-5 is/are implemented by specifically configured hardware (e.g., by one or more application specific integrated circuits (ASICs) which is/are included) separate from or in lieu of the processor 601. Some embodiments incorporate more than one of the described operations and/or functionality in a single ASIC.

The above methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

One aspect of this description relates to a memory compiler. The memory compiler includes a processor configured to perform a simulation of an operation of an input stage coupled to an input terminal of a memory circuit, wherein the simulation of the operation of the input stage is performed for various slew rate values at the input terminal to obtain corresponding extrinsic input timing delays. The processor is further configured to perform a simulation of an operation of an output stage coupled to an output terminal of the memory circuit, wherein the simulation of the operation of the output stage is performed for various capacitance loading values at the output terminal to obtain corresponding extrinsic output timing delays. The processor is further configured to perform a simulation of an operation of a section of the memory circuit between the input stage and the output stage to obtain an intrinsic timing delay. The processor is further configured to generate timing delays of the memory circuit based on the extrinsic input timing delays, the extrinsic output timing delays and the intrinsic timing delay.

Another aspect of this description relates to a memory compiler. The memory compiler includes a processor configured to execute a set of automatic scripts for performing a simulation of an operation of an input stage of a memory circuit, wherein the input stage is between an input terminal of the memory circuit and a first node of the memory circuit, and the simulation of the operation of the input stage is performed for a plurality of slew rate values to obtain a plurality of extrinsic input timing delays. The processor further configured to execute a set of automatic scripts for performing a simulation of an operation of an output stage of the memory circuit, wherein the output stage is between a second node of the memory circuit and an output terminal of the memory circuit, and the simulation of the operation of the output stage is performed for various capacitance loading values at the output terminal to obtain a plurality of extrinsic output timing delays. The processor further configured to execute a set of automatic scripts for performing a single simulation of an operation of a section of the memory circuit between the first node and the second node to obtain a single intrinsic timing delay. The processor further configured to execute a set of automatic scripts for generating a timing table based on the plurality of extrinsic input timing delays, the plurality of extrinsic output timing delays and the single intrinsic timing delay.

Still another aspect of this description relates to a memory compiler. The memory compiler includes a processor configured to execute a set of automatic scripts for receiving a netlist of a memory circuit. The processor further configured to execute a set of automatic scripts for identifying a location of an input stage of the memory circuit based on the netlist. The processor further configured to execute a set of automatic scripts for identifying a location of an output stage of the memory circuit based on the netlist, wherein a processing stage is between the input stage and the output stage. The processor further configured to execute a set of automatic scripts for performing a plurality of simulations of an operation of the input stage using a plurality of slew rate values to obtain a plurality of extrinsic input timing delays. The processor further configured to execute a set of automatic scripts for performing a plurality of simulations of an operation of the output stage using a plurality of load capacitance values to obtain a plurality of extrinsic output timing delays. The processor further configured to execute a set of automatic scripts for performing a single simulation of an operation of the processing stage to obtain a single intrinsic timing delay. The processor further configured to execute a set of automatic scripts for generating a timing table based on the plurality of extrinsic input timing delays, the plurality of extrinsic output timing delays and the single intrinsic timing delay.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system comprising:
a non-transitory computer readable medium configured to store memory compiler instructions and layout instructions;
a first processor coupled to the non-transitory computer readable medium, and configured to execute the memory compiler instructions to:
perform a simulation of an operation of an input stage coupled to an input terminal of a memory circuit, wherein the simulation of the operation of the input stage is performed for various slew rate values at the input terminal to obtain corresponding extrinsic input timing delays;
perform a simulation of an operation of an output stage coupled to an output terminal of the memory circuit, wherein the simulation of the operation of the output stage is performed for various capacitance loading values at the output terminal to obtain corresponding extrinsic output timing delays;
perform a simulation of an operation of a section of the memory circuit between the input stage and the output stage to obtain an intrinsic timing delay, wherein the simulation of the operation of the section of the memory circuit is performed for a single slew rate value or for a single capacitance loading value; and
generate timing delays of the memory circuit based on the extrinsic input timing delays, the extrinsic output timing delays and the intrinsic timing delay; and
a second processor coupled to the non-transitory computer readable medium, wherein the second processor is configured to execute layout instructions to:

generate a layout in response to a determination that the timing delays of the memory circuit satisfy predetermined requirements of the memory circuit, and instruct equipment to manufacture the memory circuit based on the generated layout.

2. The system of claim 1, wherein the second processor is further configured to redesign the memory circuit in response to the timing delays of the memory circuit failing to satisfy the predetermined requirements of the memory circuit.

3. The system of claim 1, wherein the input stage is a part of a first input/output unit (IO) of the memory circuit, and includes at least one selected from the group consisting of an input buffer and a delay stage.

4. The system of claim 3, wherein the output stage is a part of a second IO of the memory circuit, and includes at least one selected from the group consisting of an input buffer and a delay stage.

5. The system of claim 4, wherein the section of the memory circuit between the input stage and the output stage comprises:
a control line coupled to the input stage,
a word line decoder and driver coupled to the control line,
a word line coupled to the word line decoder and driver,
a memory cell coupled to the word line,
a bit line coupled to the memory cell, and
a sense amplifier or write driver coupled to the bit line, the output stage coupled to the sense amplifier or write driver.

6. A system comprising:
a non-transitory computer readable medium configured to store memory compiler instructions and layout instructions;
a first processor coupled to the non-transitory computer readable medium, and configured to execute the memory compiler instructions for:
performing a simulation of an operation of an input stage of a memory circuit, wherein the input stage is between an input terminal of the memory circuit and a first node of the memory circuit, and the simulation of the operation of the input stage is performed for a plurality of slew rate values to obtain a plurality of extrinsic input timing delays;
performing a simulation of an operation of an output stage of the memory circuit, wherein the output stage is between a second node of the memory circuit and an output terminal of the memory circuit, and the simulation of the operation of the output stage is performed for various capacitance loading values at the output terminal to obtain a plurality of extrinsic output timing delays;
performing a single simulation of an operation of a section of the memory circuit between the first node and the second node to obtain a single intrinsic timing delay;
generating a timing table based on the plurality of extrinsic input timing delays, the plurality of extrinsic output timing delays and the single intrinsic timing delay; and
a second processor coupled to the non-transitory computer readable medium, wherein the second processor is configured to execute layout instructions for:
generating a layout in response to the timing table satisfying predetermined requirements of the memory circuit, and
instruct equipment to manufacture the memory circuit based on the generated layout.

7. The system of claim 6, wherein the first processor is configured to receive information for a location of the first node from a user.

8. The system of claim 6, wherein the first processor is configured to receive information for a location of the second node from a user.

9. The system of claim 6, wherein the first processor is configured to execute the memory compiler instructions for determining a location of the first node without input from a user.

10. The system of claim 9, wherein the first processor is configured to execute the memory compiler instructions for determining the location of the first node based on a netlist of the memory circuit.

11. The system of claim 6, wherein the first processor is configured to execute the memory compiler instructions for determining a location of the second node without input from a user.

12. The system of claim 11, wherein the first processor is configured to execute the memory compiler instructions for determining the location of the second node based on a netlist of the memory circuit.

13. The system of claim 6, wherein the first processor is configured to execute the memory compiler instructions for performing a same number of simulations of the input stage and of the output stage.

14. A system comprising:
at least one non-transitory computer readable medium configured to store memory compiler instructions and layout instructions;
at least one processor coupled to the at least one non-transitory computer readable medium, and configured to execute memory compiler instructions for:
receiving a netlist of a memory circuit;
identifying a location of an input stage of the memory circuit based on the netlist;
identifying a location of an output stage of the memory circuit based on the netlist, wherein a processing stage is between the input stage and the output stage;
performing a plurality of simulations of an operation of the input stage using a plurality of slew rate values to obtain a plurality of extrinsic input timing delays;
performing a plurality of simulations of an operation of the output stage using a plurality of load capacitance values to obtain a plurality of extrinsic output timing delays;
performing a single simulation of an operation of the processing stage to obtain a single intrinsic timing delay;
generating a timing table based on the plurality of extrinsic input timing delays, the plurality of extrinsic output timing delays and the single intrinsic timing delay; and
the at least one processor is further configured to execute layout instructions for:
generating a layout in response to a determination that the timing delays of the memory circuit satisfy predetermined requirements of the memory circuit, and
instruct equipment to manufacture the memory circuit based on the generated layout.

15. The system of claim 14, wherein the at least one processor is configured to execute the memory compiler instructions for performing the plurality of simulations of the operation of the output stage prior to performing the single simulation of the operation of the processing stage.

16. The system of claim 14, wherein the at least one processor is configured to execute the memory compiler instructions for performing the single simulation of the operation of the processing stage comprising:
   performing a single simulation of an operation of a control logic; and
   performing a single simulation of an operation of at least one memory cell.

17. The system of claim 16, wherein the at least one processor is configured to execute the memory compiler instructions for performing the single simulation of the operation of the processing stage further comprising performing a single simulation of an operation of a sense amplifier.

18. The system of claim 14, wherein the at least one processor is configured to execute the memory compiler instructions for generating the timing table containing a same value for the single intrinsic timing delay for every result in the timing table.

19. The system of claim 14, wherein the at least one processor is configured to execute the memory compiler instructions for providing instructions for redesigning the memory circuit based on the timing table.

20. The system of claim 14, wherein the at least one processor is configured to execute the memory compiler instructions for performing the single simulation of the operation of the processing stage using a predetermined signal different from results of performing the plurality of simulations of the operation of the input stage.

* * * * *